(12) United States Patent
Riihimäki et al.

(10) Patent No.: US 9,057,116 B2
(45) Date of Patent: Jun. 16, 2015

(54) METHOD FOR ENHANCING SOLID-LIQUID SEPARATION IN CONJUNCTION WITH LATERITE LEACHING

(75) Inventors: Teppo Riihimäki, Linnavuori (FI); Jaakko Leppinen, Espoo (FI); Mikko Ruonala, Kantvik (FI); Liisa Haavanlammi, Espoo (FI)

(73) Assignee: OUTOTEC OYJ, Espoo (FI)

( * ) Notice: Subject to any disclaimer, the term of this patent is extended or adjusted under 35 U.S.C. 154(b) by 335 days.

(21) Appl. No.: 13/581,153

(22) PCT Filed: Feb. 21, 2011

(86) PCT No.: PCT/FI2011/050157
§ 371 (c)(1),
(2), (4) Date: Aug. 24, 2012

(87) PCT Pub. No.: WO2011/104436
PCT Pub. Date: Sep. 1, 2011

(65) Prior Publication Data
US 2012/0318102 A1    Dec. 20, 2012

(30) Foreign Application Priority Data

Feb. 25, 2010    (FI) ...................................... 20100089

(51) Int. Cl.
*C22B 3/44*    (2006.01)
*C22B 23/00*    (2006.01)
(Continued)

(52) U.S. Cl.
CPC ... *C22B 3/08* (2013.01); *C22B 3/44* (2013.01); *C22B 23/043* (2013.01); *C22B 23/0461* (2013.01)

(58) Field of Classification Search
CPC ........ C22B 3/06; C22B 3/44; C22B 23/0415; C22B 23/0461; C01G 49/0018

USPC .......................................... 75/743; 423/150.1
See application file for complete search history.

(56) References Cited

U.S. PATENT DOCUMENTS 6,680,035 B2    1/2004    Arroyo et al.
7,416,711 B2 *   8/2008    Liu et al. ....................... 423/140
(Continued)

FOREIGN PATENT DOCUMENTS

AU    2007200975 A1 *    9/2007
CN       1791690 A       6/2006
(Continued)

OTHER PUBLICATIONS

International Search Report (PCT/ISA/210) issued on Jun. 15, 2011, by the Finnish Patent Office as the International Searching Authority for International Application No. PCT/FI2011/050157.
(Continued)

*Primary Examiner* — George Wyszomierski
*Assistant Examiner* — Tima M McGuthry Banks
(74) *Attorney, Agent, or Firm* — Buchanan, Ingersoll & Rooney PC

(57) ABSTRACT

The invention relates to the hydrometallurgical treatment of laterite ores in order to recover valuable metals. More specifically, the invention presented relates to a method for improving precipitation and solid-liquid separation in conjunction with the leaching of laterite ores. According to the method the slurry exiting the leaching of laterite ores is neutralized, after which part of the slurry is routed to solid-liquid separation. Iron is precipitated from the solid-liquid separation overflow by neutralizing the solution and the solution that is formed, which includes jarosite seeds, is routed to an appropriate point in the process to control the precipitation of iron and to enhance the filterability of the solids.

16 Claims, 1 Drawing Sheet

(51) Int. Cl.
*C22B 3/08* (2006.01)
*C22B 3/00* (2006.01)

(56) References Cited

U.S. PATENT DOCUMENTS

| | | | | |
|---|---|---|---|---|
| 8,287,827 | B2 * | 10/2012 | Agin et al. | 423/140 |
| 2006/0219640 | A1 * | 10/2006 | Lehtinen et al. | 210/722 |
| 2010/0098608 | A1 | 4/2010 | Agin et al. | |

FOREIGN PATENT DOCUMENTS

| | | |
|---|---|---|
| CN | 101541985 | 9/2009 |
| WO | WO 01/32944 A1 | 5/2001 |
| WO | WO 2004/094677 | 4/2004 |
| WO | WO 2006/000098 A1 | 1/2006 |
| WO | WO 2006/029499 A1 | 3/2006 |
| WO | WO 2008/029009 A | 3/2008 |

OTHER PUBLICATIONS

International Preliminary Report on Patentability (PCT/IPEA/409) issued on May 22, 2012, by the Finnish Patent Office as the International Searching Authority for International Application No. PCT/FI2011/050157.

Search Report issued on Nov. 23, 2010, by the Finnish Patent Office for Application No. 20100089.

Chinese Office Action dated Jul. 15, 2013, issued in corresponding Chinese Patent Application No. 201180015658.4 (18 pgs.).

* cited by examiner

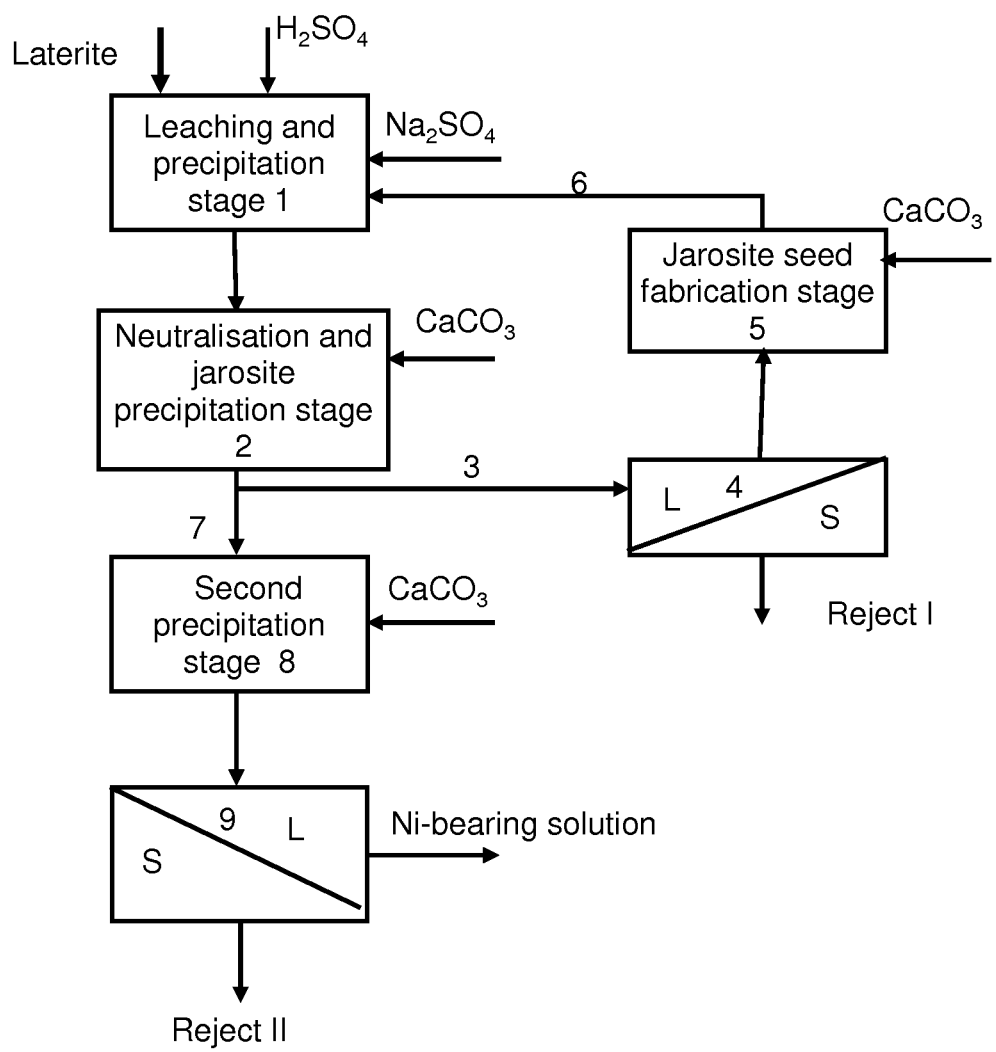

METHOD FOR ENHANCING SOLID-LIQUID SEPARATION IN CONJUNCTION WITH LATERITE LEACHING

FIELD OF THE INVENTION

The invention relates to the recovery of valuable metals in the hydrometallurgical treatment of laterite ores. More specifically, the invention presented concerns a method for improving precipitation and solid-liquid separation in conjunction with the leaching of laterite ores. According to the method the slurry exiting the leaching of laterite ores is neutralised, after which part of the slurry is routed to solid-liquid separation. Iron is precipitated from the solid-liquid separation overflow by neutralising the solution and the solution that is formed, which includes jarosite seeds, is routed to an appropriate point in the process to control the precipitation of iron and to optimise the filterability of the solids.

BACKGROUND OF THE INVENTION

The leaching of nickel-bearing oxidic ores such as laterite ores in order to recover valuable metals like nickel and cobalt can be performed in practice in many different ways. According to certain methods, laterite ore is split into limonitic and saprolitic fractions, which are processed separately. In other methods, laterite is not separated into different fractions and a common leaching treatment is carried out instead. The amount of nickel in laterites is around 0.5-4% and that of cobalt generally less than 0.2%, but they also contain a significant amount of iron, magnesium and silicates. After the leaching stages iron is precipitated and the liquid is separated from the solids. Magnesium dissolves almost completely, thus leaving mainly iron and silicates to be precipitated.

U.S. Pat. No. 6,680,035 discloses a method in which to recover the nickel and cobalt of the laterite ore the laterite is divided first into limonitic and saprolitic components. Limonite is subjected to atmospheric leaching by means of an aqueous solution of sulphuric acid and the slurry that is formed is routed to the next stage, in which the iron in solution is precipitated with a suitable precipitating agent as jarosite. Finally, the saprolitic fraction of the ore is routed to the precipitation stage, by means of which the solution is further neutralised, but the acid concentration of the solution is regulated to be in the region of 5-30 g/l, so that the magnesium and nickel dissolve. Part of the waste residue from the precipitation stage can be recycled after solid-liquid separation back to the precipitation stage as seeds.

WO application 2006/029499 discloses a method for recovering nickel and cobalt, in which leaching takes place both atmospherically and as a pressure leach. In this method too, laterite ore is divided into limonitic and saprolitic components. Leaching of the limonitic part occurs at atmospheric pressure with a mineral acid, which is mainly sulphuric acid and partly hydrochloric acid. After the first leaching stage, the slurry is routed to pressure leaching, into which the saprolitic part of the ore is also fed. After pressure leaching, solid-liquid separation is performed in order to separate the iron-containing residue and the solution containing valuable metals from each other. In pressure leaching conditions the iron will have precipitated as hematite. In one application of the method, the iron-containing residue is recycled from the first stage of a multi-stage solid-liquid separation to the pressure leaching stage as seeds.

WO patent application 2006/000098 describes a method in which on laterite ore is subjected first to crushing, after which it is made to react with a mineral acid in a mixing drum for instance. The amount of acid is sufficient to sulphate the non-ferrous metals, but not the iron. After sulphation the hardened material is ground and leached. In one application of the method, iron-containing residue from the first of the multi-stage solid-liquid separation process is recycled to the leaching stage as seeds.

WO patent application 2008/029009 describes a method in which the limonite and saprolite components of laterite are treated together. The solids are slurried in seawater and leached by means of a solution containing sulphuric acid. Part of the slurry obtained from leaching undergoes solid-liquid separation, the underflow of which is fed back to leaching to act as jarosite seeds and the overflow is combined into the slurry exiting leaching. The slurry is neutralised to precipitate the iron, after which solid-liquid separation is performed to form an overflow solution containing valuable metals and an iron residue underflow.

In the methods described above the residue formed in solid-liquid separation is recycled to some earlier stage as seeds to accelerate the precipitation of iron. However, residue formed in solid separation contains not only iron compounds and gypsum but also the components of laterite that remain undissolved such as silicates, which hinder solid-liquid separation. For this reason, the recycling of leach residue is not the most beneficial way to control precipitation.

PURPOSE OF THE INVENTION

The purpose of the invention is to avoid the drawbacks of the methods described above by feeding in solids produced separately as seeds that promote the precipitation of iron. According to one embodiment of the invention iron-containing solids such as jarosite crystals are used as precipitation seeds. The slurry or solid, which contains the above-mentioned iron-containing precipitation seeds, is produced according to one embodiment of the invention from the solid slurry generated in the process so that all or the majority of the other leach residue generated in the process is separated. In this way the amount of residue to be recycled is reduced and the separation of the generated iron-containing residue from a solution containing valuable metals is improved.

SUMMARY OF THE INVENTION

The essential features of the invention will be made apparent in the appended claims.

The invention relates to a method for recovering valuable metals of laterite ore, in which method laterite ore is leached in mineral acid and the iron dissolved in leaching is precipitated by means of a suitable neutralising agent and the iron-containing residue thus generated is separated by solid-liquid separation, where solid-liquid separation is enhanced so that iron-containing solids are fed into at least one stage of the leaching process as a precipitating agent to precipitate the iron as jarosite.

In the method according to one preferred embodiment of the invention the precipitating agent consists of jarosite crystals and gypsum, of which the total amount is preferably over 90 percent by weight.

According to one preferred embodiment of the invention, over 20 percent by weight, preferably over 40 percent, of the solids of the precipitating agent consist of jarosite crystals.

In the method according to one preferred embodiment of the invention, the precipitating agent is fed into a leaching stage of the laterite leaching process.

In the method according to one preferred embodiment of the invention, the precipitating agent is fabricated so that the slurry exiting the leaching stage is routed to the neutralisation and precipitation stage to precipitate the iron as jarosite and the first part of the neutralised slurry is routed to solid-liquid separation, and from its overflow solution that contains valuable metals and dissolved iron, seeds are precipitated in the jarosite seed fabrication stage and the precipitated jarosite seeds are routed as a thickened slurry to some laterite treatment stage and the second part of the neutralised slurry is routed to a second precipitation stage to precipitate the rest of the iron from solution, after which solid-liquid separation is performed to separate the valuable metal-containing solution and the iron residue to be discarded from the process from each other.

According to one preferred embodiment of the invention, it additionally relates to a method for controlling the precipitation of dissolved iron in conjunction with the leaching of valuable metals from laterite ore and enhancing the solid-liquid separation of the generated residue and the valuable metal-containing solution, in which a precipitating agent is fed into the laterite leaching stage to precipitate the iron as jarosite and the slurry from the leaching stage is routed to a neutralising and precipitation stage to precipitate the iron as jarosite and the first part of the neutralised slurry is routed to solid-liquid separation, from which the overflow solution obtained, which contains valuable metals and dissolved iron, is neutralised to precipitate the iron from solution as jarosite seeds in a jarosite seed fabrication stage and the solution containing the precipitated jarosite seeds is routed to some laterite treatment stage and the second part of the neutralised slurry is routed to a second precipitation stage to precipitate the remaining iron from solution, after which solid-liquid separation is performed in order to separate the solution containing valuable metals and the iron residue to be discarded from the process from each other.

In the method according to one preferred embodiment of the invention, the first part of the slurry to be separated for the formation of jarosite seeds comprises 10-50%, preferably 20-40% of the total amount of slurry.

In the method according to one preferred embodiment of the invention, the solution containing jarosite seeds is routed to the leaching stage.

In the method according to one preferred embodiment of the invention, the solution containing jarosite seeds is routed to the neutralisation and precipitation stage.

In the method according to one preferred embodiment of the invention, the amount of jarosite seeds added in leaching is 1-100 g/l, preferably 10-50 g/l.

In the method according to one preferred embodiment of the invention, the acid concentration of the slurry in the second precipitation stage is 10-20 g/l.

In the method according to one preferred embodiment of the invention, the pH in the end of the second precipitation stage is regulated to be in the region where the rest of the iron will precipitate. Especially preferable pH at this stage is between 3-4.

In the method according to one preferred embodiment of the invention, the underflow formed in solid-liquid separation of the first part of the neutralised slurry is reject that is to be discarded from the process.

LIST OF DRAWINGS

FIG. 1 is a flowsheet of one method accordant with the invention.

DETAILED DESCRIPTION OF THE INVENTION

In the leaching of laterite ores, in which mineral acids such as sulphuric acid are used, in addition to the dissolving of valuable metals iron also dissolves, and the iron has to be separated from the solution containing valuable metals by precipitation. It has been stated in the descriptions of the prior art that iron precipitation is aided when part of the iron-containing residue generated in the process is recycled as precipitation seeds either in the leaching stage feed or into the precipitation stage of side metals such as iron. Consequently other ore components such as silicates are also transferred back to the process along with the iron-containing residue. The filterability of silicates is generally speaking poor and the method aims to avoid their recirculation.

The method according to the invention presented here is based on the fact that a sidestream is taken apart of the iron-containing slurry generated in laterite ore leaching, from which iron precipitation-aiding solids are fabricated in a dedicated process stage. In that case the sidestream is subjected to solid-liquid separation and the solution obtained from separation is neutralised, so that an iron-containing solid such as jarosite is formed in the solution, in which solid there is no significant presence of ore components undissolved in leaching such as silicates. When only jarosite or a residue formed in jarosite neutralising precipitation, preferably jarosite and gypsum seeds containing iron gypsum precipitate, is introduced as precipitation seeds, the amount of ore components to be recycled is also reduced.

One preferred embodiment of the invention presented here is depicted in more detail in FIG. 1. The method can also be used when laterite ore is divided into separate fractions, which are leached in different stages. The method can be adapted for both batch reactors and a continuous reactor configuration. For the sake of simplicity, operations are placed in FIG. 1 in different cycles or stages, but according to the preferred embodiment of the invention the treatment of laterite from leaching through to solid-liquid separation occurs in consecutive reactors, in which slurry flows as overflow from one reactor to the next.

According to FIG. 1 laterite ore is not divided into different fractions; instead it is leached all together preferably by means of a mineral acid, preferably sulphuric acid or a mineral acid containing sulphuric acid as the main component. In the embodiment shown in FIG. 1 the mineral acid is sulphuric acid in atmospheric leaching. In leaching stage 1 laterite is fed into the solution so that the solids content of the solution is around 300-500 g/l, typically 400-450 g/l. 500-1000 g of sulphuric acid per kg of laterite is fed into the leaching stage depending on the composition of the laterite. It is preferable to feed it into the first reactors at the start of the leach. Depending on the properties of the laterite, leaching time is 6-20 h. The iron in the laterite is mainly in the form of goethite and it dissolves at the acid concentration of the leaching stage. When iron is precipitated as jarosite, an appropriate precipitating agent is fed in as early as leaching stage 1. The precipitating agent is preferably a water-soluble compound of sodium, potassium, magnesium or ammonia. For the sake of simplicity, FIG. 1 illustrates the use of sodium sulphate as precipitating agent. When the sulphuric acid concentration of the slurry to be treated has fallen to a level of 10-70 g/l as a consequence of the dissolution reactions, the valuable metals will have largely dissolved and the iron begins to precipitate as jarosite. The neutralisation of the slurry is started in the following process stages. The neutralisation stage is called the neutralisation and jarosite precipitation stage 2 in the flowsheet (FIG. 1), even though leaching and precipitation occur in consecutive reactors without solid-liquid separation, which is normally carried out between the stages.

In neutralisation stage 2 some suitable neutralising agent is routed into the slurry so that the acid concentration of the slurry falls to a value of 10-20 g/l, which is advantageous for jarosite precipitation. The temperature is adjusted to be between 75° C. and the boiling point of the solution. One preferred neutralising agent is limestone $CaCO_3$, but naturally other neutralising agents can be used too. As a result of neutralisation the precipitation as jarosite of the trivalent iron contained in solution, which began in the leaching stage, continues effectively. The first part of the slurry 3, preferably 20-40%, is taken into a sidestream and routed to solid-liquid separation 4. The solid-liquid separation is for example filtration. The overflow solution obtained from solid-liquid separation contains a sufficient amount of iron and this is precipitated in jarosite seed fabrication stage 5 by feeding a neutralising agent into the stage, which is preferably the same as the substance fed into the actual neutralising stage 2, but it may be for example some other calcium- or sodium-based neutralising agent. Since sodium sulphate that was fed in the leaching stage is also present in solution, iron precipitates as sodium jarosite. When the generated jarosite crystals are recycled in the seed fabrication stage, the crystals are made to coarsen, which facilitates the precipitation of jarosite on the surface of the seeds. The thickened slurry obtained in seed fabrication, in which there is typically 300-600 g of jarosite seeds per liter and the gypsum formed in the neutralisation reaction, is routed to a suitable point in the process, which in the embodiment of FIG. 1 is leaching stage 1. If a non-calcium-bearing precipitating agent is used as neutralising agent, gypsum is not formed in the solution. The underflow of solid-liquid separation can be removed from the process (reject I) or routed to second precipitation stage 8, in which its solid-liquid separation properties are improved and the valuable substances it contains are recovered.

Depending on the leaching process and laterite type the jarosite crystals formed can also be fed to the actual neutralisation and precipitation stage (2).

When jarosite seeds are fed into the leaching or precipitation stage, they form a surface that facilitates the precipitation of the trivalent iron in solution and the iron precipitation can start as early as the leaching stage. For this reason in FIG. 1 leaching stage 1 is also described as a precipitation stage.

The second part 7 of the neutralised slurry exiting neutralisation stage 2 is fed further to second precipitation stage 8, in which almost all of the iron contained in solution is precipitated by means of a neutralising agent from the slurry. However it must be noted that some of the iron has already precipitated as jarosite in neutralisation and precipitation stage 2 and in the second precipitation stage 8 it is largely a question of jarosite precipitation in the optimal conditions for it. The amount of neutralising agent is adjusted by means of pH measurement so that at the end of the stage the pH value is 3-4, whereby the filterability of the slurry is improved further. At the end of the stage, the amount of iron in solution is only some tens of milligrams per liter. When the slurry has been neutralised to a pH value of 3-4, iron has been precipitated mainly as ferric hydroxide, but the amount is small, 1-5% in magnitude compared to the amount of iron residue formed in the jarosite precipitation stage. Aluminium is also mostly precipitated from solution in the conditions of the second precipitation stage.

The slurry from the second precipitation stage is routed to solid-liquid separation 9, from which the overflow is routed to valuable metal recovery and the underflow is a process residue that is to be discarded (reject II).

When jarosite is used as jarosite seeds, in which there is no leach residue present or the leach residue has been mostly removed, the following benefits are gained:

Pure jarosite seeds improve the jarosite precipitation that occurs during leaching. It has been found in the tests carried out that when feeding pure jarosite seeds into the leaching stage, 30% of the iron was precipitated during the leaching stage, whereas when using leach residue only 5% of the iron was precipitated in this stage, even though the amount of seeds recycled in the leach residue was many times greater than that of the pure seeds.

Leaching may be performed with a higher solid content with regard to the laterite feed because the amount of residue to be added to leaching is small. This reduces the reactor capacity required in leaching and reduces the overall consumption of acid and also that of neutralising agent in the process, whereby the amount of final waste is also reduced.

Using pure jarosite seeds achieves better filterability of the final slurry than using leach residue. It was found in the tests performed that filterability was almost doubled.

When jarosite seeds are prepared in a separate stage, the coarsening of the seeds can be achieved in the process with a far smaller internal circulation than coarsening the seeds by recycling leach residue.

EXAMPLES

Composition of Laterite

In the tests of the example the laterite studied is situated between the nontronitic and limonitic type. The metal content percentage by weight of the laterite is presented in Table 1. The laterite has approx. 28% iron oxides, mostly goethite, 25% smectite and other clay minerals, 25% quartz, 16% serpentinitic minerals 3% calcite, 2.3% asbolane and 1.5% chromite. The clay minerals bear 48% of the nickel and the rest is mostly in the asbolane and goethite, with asbolane bearing the majority of the cobalt.

TABLE 1

| Metal content of laterite used in tests, % by weight. | | | | | | | |
|---|---|---|---|---|---|---|---|
| Al | Co | Cr | Fe | Mg | Mn | Ni | Si |
| 2.41 | 0.06 | 0.72 | 17.8 | 5.25 | 0.56 | 0.95 | 19.63 |

Example 1

Laterite, which had been ground in a ball mill for 3 minutes, was mixed into water so that a solids content of 400 g/L was obtained and then leached atmospherically at a temperature of 95-100° C. with mixing of 800 rpm. The leaching was begun by feeding 760 g of acid per kg of laterite for one hour. Leaching time was 12 h, after which the test was continued by dividing the slurry containing leach residue into two parts, which were neutralised, and the iron was precipitated as jarosite with a 300 g/L calcium carbonate slurry. 75 g/L pure jarosite seeds were added to one part and 100 g/L of the same kind of leach test final residue was added to the other, containing 30-35% jarosite with the rest being leach residue and gypsum. In the tests, the iron was precipitated as sodium jarosite using sodium sulphate as an aid. On the basis of the test, the relative filterability of the leach residue after leaching was about 20 kg/m$^2$h. When iron was precipitated as jarosite with calcium carbonate mixed with the leach residue, a relative filterability of 980 kg/m$^2$h was achieved when adding jarosite seeds and 510 kg/m$^2$h when adding final residue.

Example 2

Laterite, which had been ground in a ball mill for 1 minute, was mixed into water so that a solids content of 500 g/L was obtained and leached atmospherically at a temperature of 95-100° C. with mixing of 800 rpm. The leaching was begun by feeding 660 g of acid per kg of laterite for one hour. In leaching a total of 10 g/L jarosite-gypsum seeds fabricated from an authentic solution were added to the slurry at the start of the test, of which 6 g/L were jarosite and 4 g/L gypsum, as well as approx. 15% excess as sodium sulphate. Leaching time was 16 h, after which the slurry was neutralised and the iron was precipitated as jarosite with the leach residue. The precipitating agent used was calcium carbonate.

As a comparative experiment the same laterite that had been ground for 1 minute in a ball mill was subjected to an atmospheric leaching test, in which the laterite was leached to a solids content of 350 g/L and 75 g/L of the leach residue of the test made earlier with pure jarosite and gypsum seeds, containing 36% jarosite, 26% gypsum and 38% leach residue and other precipitated substances, was added at the start of the leach. Leaching time was 16 h, and during the first hour of the test 500 g of acid was fed into the solution per kg of laterite. During leaching the acid concentration was kept at the level of approx. 60 g/L, which corresponds to the acid concentration of the test made with pure seeds. The overall acid consumption of leaching was 760 g/kg of laterite. Sodium sulphate was also used as a precipitating agent.

On the basis of the comparative test a relative filterability of approx. 450 kg/m$^2$h was achieved with pure seeds, whereas recycling the leach residue resulted in a relative filterability of 380 kg/m$^2$h. Leaching yields for pure seeds were 93.6% and 94.6% when recycling leach residue. When using pure seeds approx. 25% of the iron was precipitated during leaching, the iron content of the solution fell from 64 g/L to 50 g/L and the iron concentration of the residue grew from 5.8% to 9.2%, whereas when recycling leach residue the iron content of the solution remained at the level of 50 g/L and the iron concentration of the residue at 6.4%. Acid consumption was about 15% smaller when using seeds thanks to the higher solids content used in leaching and the iron precipitation that had occurred in leaching.

The invention claimed is:

1. A method for recovering the valuable metals of laterite ore, comprising:
    leaching the laterite ore into mineral acid in a leaching stage; and
    precipitating iron dissolved in the leached laterite ore by means of a suitable neutralizing agent, iron-containing residue thus generated being separated by solid-liquid separation wherein solid-liquid separation is enhanced so that iron-containing solids produced in a separate process stage are fed as a precipitation agent to precipitate the iron as jarosite,
    wherein the precipitating agent comprises jarosite crystals and gypsum, in an amount of over 90 per cent by weight.

2. The method according to claim 1, wherein over 20 percent by weight of the precipitating agent in solid form comprises jarosite crystals.

3. The method according to claim 1, wherein the precipitation agent is fed into the leaching stage.

4. The method according to claim 1, wherein the precipitating agent is fabricated so that a slurry exiting the leaching stage is routed to a neutralization and precipitation stage to precipitate the iron as jarosite; a first part of the neutralized slurry is routed to solid-liquid separation, from whose overflow solution, which contains valuable metals and dissolved iron, seeds are precipitated in a jarosite seed fabrication stage; the precipitated jarosite seeds are routed as a thickened slurry to a laterite treatment stage; a second part of the neutralized slurry is routed to a second precipitation stage to precipitate a remainder of the iron from solution, after which solid-liquid separation is performed to separate a valuable metal-containing solution and an iron residue from each other.

5. A method according to claim 1, wherein over 40 percent by weight of the precipitating agent in solid form comprises jarosite crystals.

6. A method for controlling the precipitation of iron that has dissolved in conjunction with the leaching of valuable metals from laterite ore and enhancing a solid-liquid separation of a residue generated and a valuable metal-containing solution, comprising:
    feeding a precipitating agent into a laterite leaching stage to precipitate iron as jarosite;
    routing a slurry from the leaching stage to a neutralization and first precipitation stage to precipitate the iron as jarosite;
    routing a first part of the neutralized slurry to solid-liquid separation, whose overflow solution, which contains valuable metals and dissolved iron is neutralized to precipitate the iron from solution as jarosite seeds in a jarosite seed fabrication stage;
    routing the solution containing precipitated jarosite seeds to a laterite treatment stage; and
    routing a second part of the neutralized slurry to a second precipitation stage to precipitate a remainder of the iron from solution, after which solid-liquid separation is performed to separate a valuable metal-containing solution and an iron residue from each other, wherein
    the solution containing jarosite seeds is routed to the neutralization and first precipitation stage.

7. The method according to claim 6, wherein the first part of the slurry to be separated in order to form jarosite seeds comprises 10-50 wt % of the total amount of slurry.

8. The method according to claim 7, wherein in a final part of the second precipitation stage the pH is regulated to a range at which a remainder of the iron is precipitated.

9. The method according to claim 6, wherein the solution containing jarosite seeds is routed to the leaching stage.

10. The method according to claim 9, wherein in a final part of the second precipitation stage the pH is regulated to a range at which a remainder of the iron is precipitated.

11. The method according to claim 6, wherein the amount of jarosite seeds in leaching is 1-100 g/l.

12. The method according to claim 11, wherein in a final part of the second precipitation stage the pH is regulated to a range at which a remainder of the iron is precipitated.

13. The method according to claim 6, wherein the acid concentration of the slurry in the second precipitation stage is 10-20 g/l.

14. The method according to claim 13, wherein in a final part of the second precipitation stage the pH is regulated to a range at which a remainder of the iron is precipitated.

15. The method according to claim 6, wherein in a final part of the second precipitation stage the pH is regulated to a range at which a remainder of the iron is precipitated.

16. The method according to claim 6, wherein an underflow formed in the solid-liquid separation of the first part of the neutralized slurry is discarded from the process.

* * * * *